May 30, 1967

H. S. JONES 3,322,483

ELECTROSTATICALLY-CURVED MEMBRANE TYPE MIRROR

Filed June 28, 1965

INVENTOR

Harry S. Jones

INVENTOR
Harry S. Jones

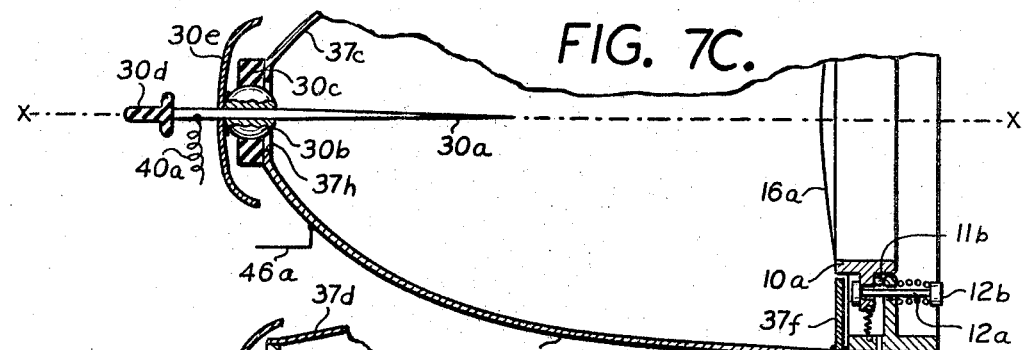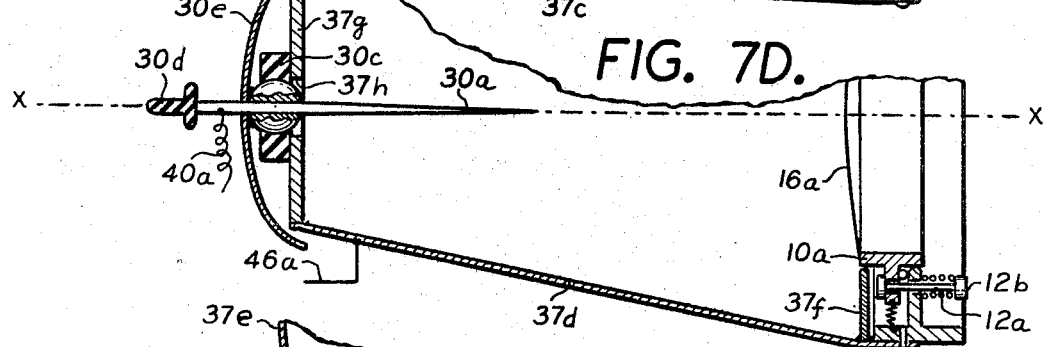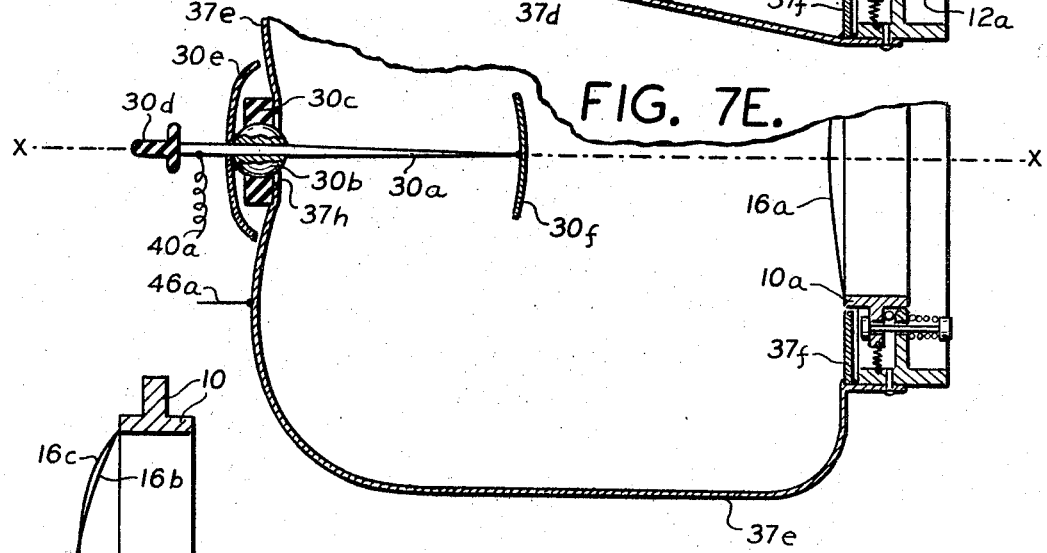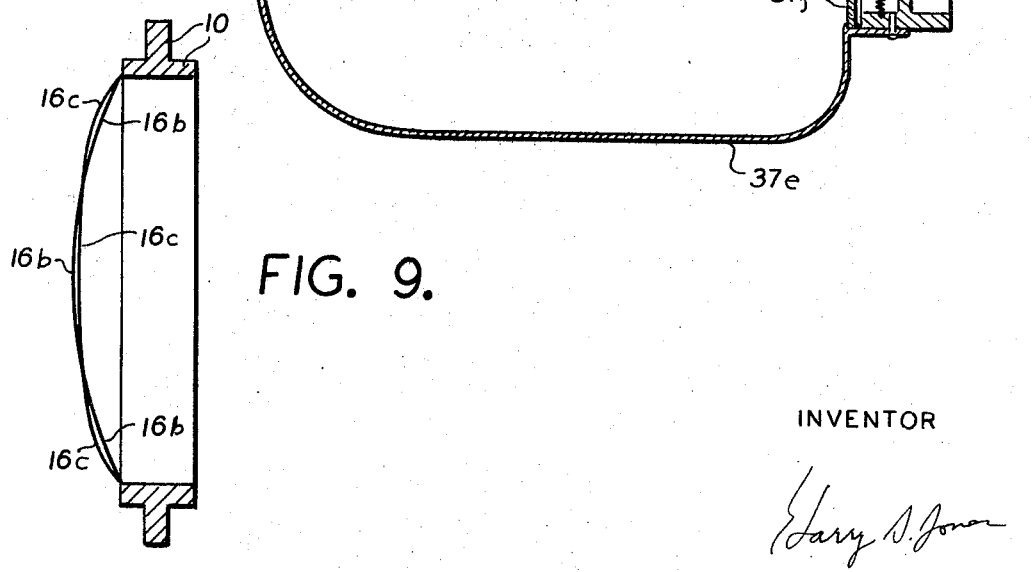

United States Patent Office 3,322,483
Patented May 30, 1967

3,322,483
ELECTROSTATICALLY-CURVED MEMBRANE TYPE MIRROR
Harry S. Jones, 933 Hudson St.,
Hoboken, N.J. 07030
Filed June 28, 1965, Ser. No. 467,415
6 Claims. (Cl. 350—295)

This application is a continuation-in-part of my co-pending application, Ser. No. 272,145 filed Apr. 10, 1963, now abandoned.

This invention relates to reflectors such as are used for telescopes or radiation antennas and, more especially, to means for reducing the cost and weight and for increasing the accuracy and controllability of reflectors, particularly those used in outer space.

It is an object of this invention to provide an improved construction in which the reflecting surface is provided by a sheet or membrane which is stressed to any desired optical surface by means of electrical forces of attraction. Specifically, this invention provides means for the correction of inaccuracies and of limitations inherent in membrane mirrors of the type revealed in the prior art described by Muller and by Evans. Other objects, features and advantages of the invention will appear or be pointed out as the description proceeds.

In the Muller devices, English Patent No. 380,473 dated Sept. 5, 1932, it is clear that in some cases very thin membranes or "skins" are used solely for the purpose of obtaining the highest possible ratios of mirror curvature change to deflection voltage change, a desirable characteristic for radiation control applications where reflector shape is a time function. It is clear that the construction of membrane type telescope mirrors of high optical accuracy for astronomical purposes was not considered by Muller. For example, the use of such membranes to form precision curved optical mirrors of astronomical quality is not discussed or included in the description or claims. For these reasons it is clear that the importance of the electrode shape, spacing, or of its location on the side of the membrane opposite to the membrane support ring was not recognized or stated by Muller.

In the writer's copending application the importance of means for obtaining proper deflection electrode shape, spacing, deflection potential and also of location of the deflection electrode on the side of the membrane opposite to the membrane support ring was recognized and described. This earlier device and several improved devices for use in telescope systems designed for use in outer space are described below.

Other objects, features and advantages of the invention will appear or be pointed out as the description proceeds.

In the drawings, forming a part hereof, in which like reference characters indicate corresponding parts in all the views:

FIGURES 7A, 7B, 7C, 7D and 7E are diagrammatic sectional views showing various improved constructions made in accordance with this invention.

FIGURE 9 is a schematic sectional view used for explanatory purposes.

Figure 1:
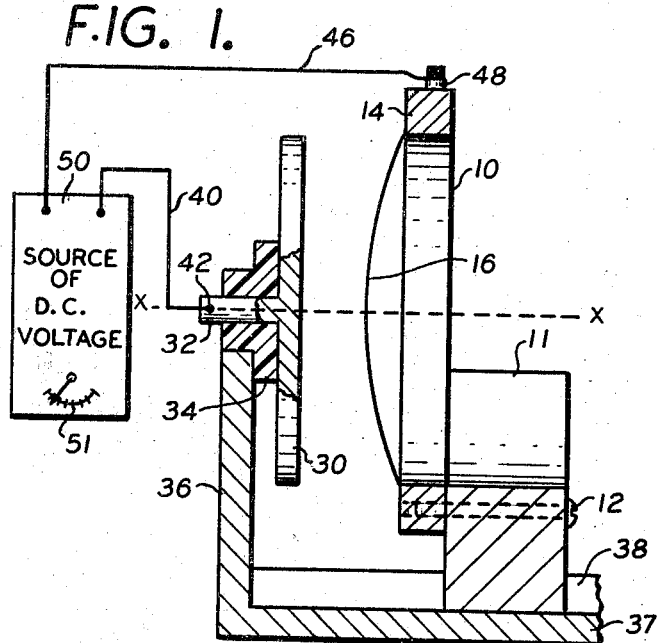
FIGURE 1 is a diagrammatic view, mostly in section, showing a membrane reflector made in accordance with this invention.

FIGURE 1 shows an annular support ring 10 attached to another support 11 by bolts 12 or by other suitable means. Ring 10 is preferably made of a highly stabilized steel and surface 14 of ring 10 is ground and polished so that the intersection between surface 14 and surface 24 is a true circle to within an accuracy of about $1 \times 10^{-6}$ inch or better. For practical purposes, surface 14 may be a precision flat, spherical or conical surface and surface 24 may be cylindrical or conical. Surfaces 14 and 24 must be highly polished and the circular edge of intersection of these surfaces must be "razor" sharp and of the same quality as that of an optical roof prism. A metal-coated collodion membrane 16 is attached to surface 14 of ring 10.

Figure 2:
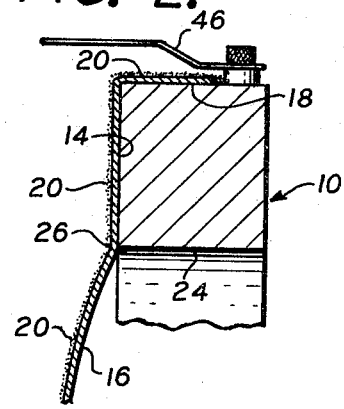
FIGURE 2 is an enlarged, fragmentary view of a portion of the construction shown in FIGURE 1.

Collodion membranes may be made by casting upon a still water surface. The extremely thin membranes normally used (5 to $20 \times 10^{-6}$ inches thick) must be removed from the water surface by means of a previously-immersed thin plate having a thin-edged hole across which the membrane is to be held. Such a removal plate must be very carefully lifted out of the water with its faces vertical in such a manner that the membrane is removed as a double membrane across the hole. When such a membrane 16 is used to produce a precision objective mirror it is applied to a precision support ring such as ring 10 by bringing surface 14 of ring 10 and the membrane 16 as held by the removal plate slowly into contact while they are parallel. When the membrane has adhered to surface 14 the excess membrane material is cut away by any suitable means. The membrane material inside ring 10 then becomes the support membrane 16 shown in FIGURES 1, 2 and 3. The support membrane 16 is preferably very thin and may be about (5 to $20 \times 10^{-6}$ inches thick). Such a membrane will normally cling tenaciously to the surface 14 of the ring 10 without adhesive or any other additional holding means. When formed and applied as previously described the membrane 16 extends to the outer circumferential edge of the ring 10 as indicated in FIGURE 2. Thicker membranes may be fastened to surface 14 by a gelatin cement when necessary.

The outer surface of membrane 16 is coated with metal 20 to obtain a reflecting surface. Gold may be used and is preferably applied to the membrane by evaporating the metal under vacuum while it is rotated about its optical axis X—X. When the metal is applied to membrane 16 after the membrane is placed on ring 10, the application of the metal 20 is continued around the outer corner of the ring 10, and across surface 18 to a location beyond the membrane material so that metal is in direct contact with the metal surface of ring 10. This establishes electrical continuity from the metal on membrane 16 to the metal of ring 10. The metal 20 might also be applied to membrane 16 before the membrane is laid upon ring 10 and when this is done the metal may be on the opposite side, the metal making direct electrical and physical contact with surface 14 of ring 10.

The amount of gold applied to membrane 16 may vary but should be kept as thin as possible in order to leave the membrane with the desired elastic characteristics. An application of gold by evaporation under vacuum until the gold-coated surface of membrane 16 becomes approximately 75% or more reflective relative to solid gold has been found to give good results. Other reflective metals besides gold can be applied to membrane 16 to obtain a reflective surface. Antimony may be substituted, and so may silver, preferably over a base coat of gold. These metals are applied in the same manner by evaporation in vacuo.

Electrode 30 is provided with a stem 32 extending rearwardly through an electrical insulating bushing 34, which is preferably made of nylon or other good insulating material. The bushing 34 is carried by a support 36 and is preferably attached to a fixed base 37.

The base 37 has two guide rails 38 extending parallel to axis X—X which is also the axis of ring 10 and electrode 30. The ring support 11 is slidable along the rails 38 as a guideway to shift the membrane closer to the electrode 30 or to move it further away.

A conductor 40 is attached to a terminal 42 on the stem 32 of electrode 30. Another conductor 46 is attached to metal ring 10 at a terminal 48. Both conductors are flexible. The outer ends of electrical conductors 40 and 46 are connected to a source of D.C. voltage indicated by the reference character 50. The D.C. voltage can be changed by an adjustment 51.

When membrane 16 and electrode 30 are charged by voltage from voltage source 50 membrane 16 is attracted toward electrode 30 and is stressed and deflected to a concave shape as shown in FIGURE 1. A higher voltage and resulting higher charge on membrane 16 and electrode 30 results in a stronger attraction and greater deflection of membrane 16.

A reduction in the distance between membrane 16 and the electrode 30 results in a stronger attraction without any increase in the D.C. voltage and, conversely, an increase in the spacing of the electrode from the membrane reduces the forces of the attraction and increases the focal length of the reflecting membrane surface without requiring any change in the voltage.

A flat electrode 30, such as shown in FIGURE 1, coextensive in area with the free portion of membrane 16 or larger and spaced in parallel relation to the undistorted membrane 16, exerts a nearly uniform attraction for the membrane and with a controlled voltage will result in deflection of the membrane to a substantially spherical surface when the electrode spacing and the voltage are properly chosen. Other surfaces for the reflector can be obtained by using electrodes of different shapes, spacings and other controlled voltages.

Figure 3:
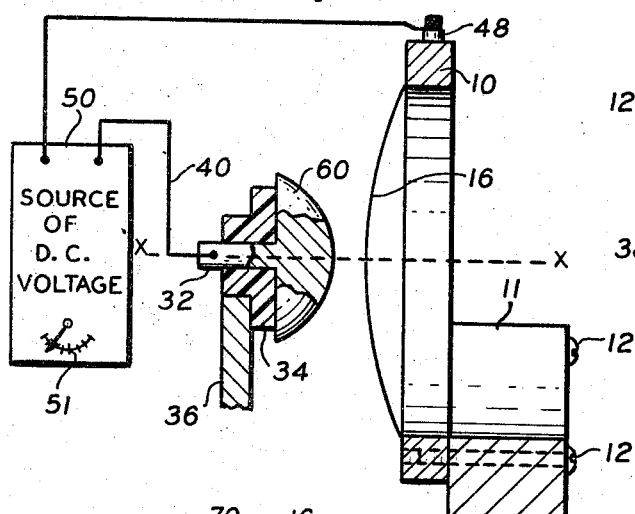
FIGURE 3 is a view similar to FIGURE 1 but showing a modified construction of the invention.
Figure 4:
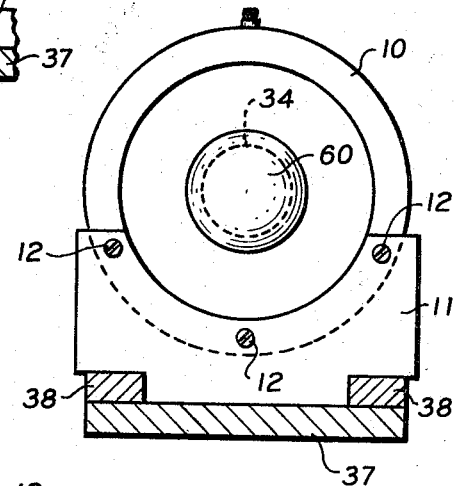
FIGURE 4 is a front view of the apparatus shown in FIGURE 3, the view being taken from the right in FIGURE 3.

FIGURE 3 shows a construction which is the same as FIGURE 1 except that an electrode 60, having a stem 32 is substituted for electrode 30. The bushing 34, support 36 and other parts are the same as in FIGURE 1. The electrode 60 is formed with a concave or convex surface and is located in axial alignment with axis X—X and membrane 16. By properly selecting the potential difference, the contour, size, and axial spacing of the electrode surface 60, membrane 16 can be deflected into various geometrical shapes, including spherical, elliptical, parabolic and hyperbolic shapes, as desired for the particular application for which the reflector is intended.

Figure 5:
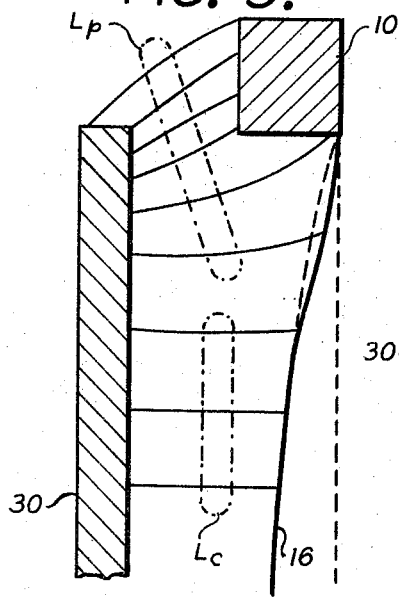
FIGURE 5 is an enlarged fragmentary sectional view of a construction similar to that shown in FIGURE 1 and illustrates another electric field configuration.
Figure 6:
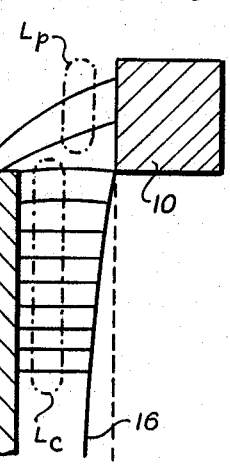
FIGURE 6 is an enlarged fragmentary sectional view of a construction similar to that shown in FIGURE 1 and illustrates another electric field configuration.

In the system described above it is of utmost importance that the membrane be attached to the side of ring 10 facing electrode 30. If this is not done it will not be possible to obtain an optical surface having the desired shape near the outer edge of ring 10. In FIGURE 5 the dotted line represents the outer portion of a desired spherical, parabolic, hyperbolic or other desired curve which blends smoothly with the inner portion of the curve. The solid line shown close to the dotted line illustrates the type of peripheral distortion of the desired curve which results when membrane 16 is not located on the side of ring 10 which faces electrode 30. This distortion is due to shunting of the electrical field lines $L_P$ from the peripheral region of membrane 16 by ring 10 as shown in FIGURE 5. Lines $L_C$ represent the field lines which are substantially unaffected by the presence of ring 10. Although these distortions are usually very small and are greatly exaggerated in FIGURE 5 for the purpose of illustration, they would cause the outer periphery of a precision optical mirror, otherwise accurate to within $1 \times 10^{-6}$ inch, to be inaccurate by 10 to 100 times $1 \times 10^{-6}$ inch. FIGURE 6 illustrates the negligible shunting of field lines at the periphery of membrane 16 when the membrane is attached to the side of ring 10 facing electrode 30.

Although astronomical primary and secondary mirrors of high precision ($1 \times 10^{-6}$ accuracy) might be produced by a multiplicity of small electrodes adjacent to membrane 16, each electrode being controlled to the voltage necessary to achieve a desired curve, such a procedure would become extremely complex, costly and heavy. However, a far simpler construction will permit lightweight mirrors of the highest precision ($1 \times 10^{-6}$ accuracy) to be used in telescopes orbiting in outer space. A telescope using such a mirror could be focused electrically as well as mechanically. The optical figure of the mirror could be checked and even modified by local or remotely controlled electrical and mechanical adjustments, if desired, while the system is orbiting in space.

Figure 8:
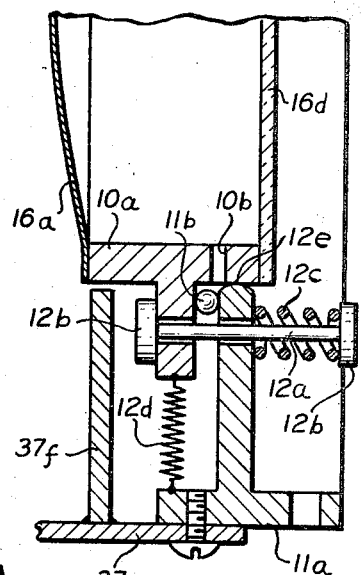
FIGURE 8 is an enlarged fragmentary view of a detail of the construction used in FIGURES 7A, 7B, 7C, 7D and 7E.
Figure 7A:
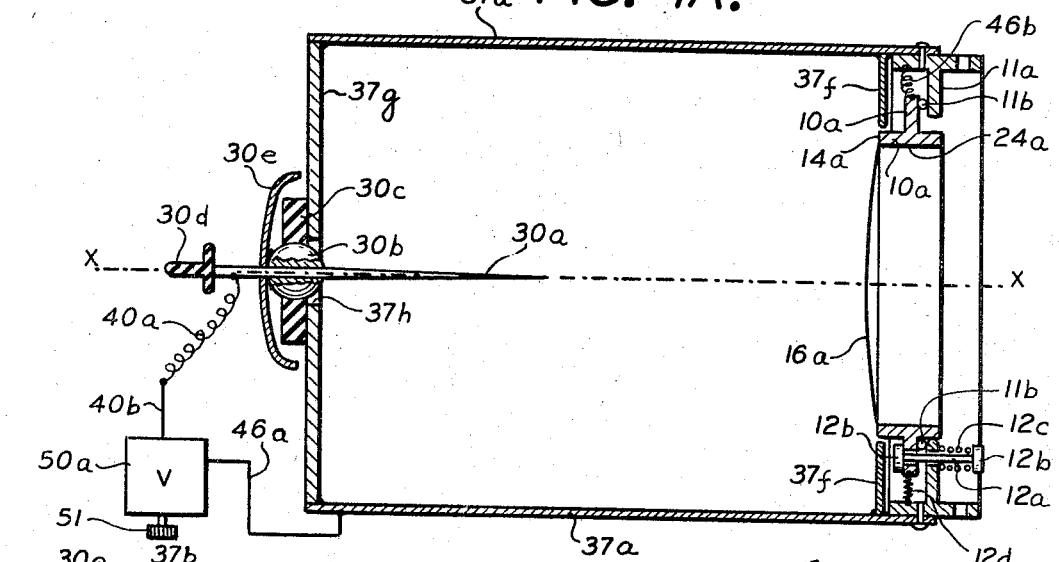
Figure 7B:
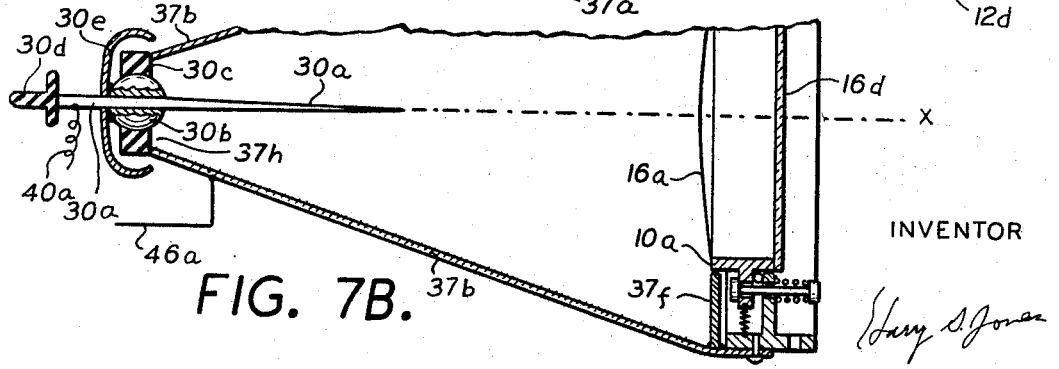

FIGURES 7A and 8 illustrate one simple form of membrane type objective mirror suitable for use in an orbiting telescope system. An electrically-conductive and reflectively-coated membrane 16a of highly-uniform thickness, pre-stress, and elastic parameters is attached by self-adherence or by a suitable cement to a membrane support ring 10a constructed of a highly-stable material such as quartz, Pyrex, ceramic or a stabilized steel such as "Ketos" steel. Surfaces 14a and 24a of ring 10a must intersect along a molecularly-sharp edge that is a true circle having an accuracy in the order of $1 \times 10^{-6}$ inch or $\frac{1}{20}$ wavelength of the radiation to be reflected.

To prevent distortion of ring 10a due to differential movements between mounting ring 11a and ring 10a caused by gross stresses applied to mounting ring 11a by external causes of any kind, or caused by thermal expansion differentials between rings 10a and 11a, ball-bearings or roller bearings 11b, or other suitable means for minimizing friction radial to system axis X—X, may be placed between rings 10a and 11a. Rings 10a and 11a are held against bearings 11b by three tensioning means, each consisting of a rod or cord 12a attached to washers 12b and a compression spring 12c. Rods or cords 12a pass through oversize holes in the peripheral portion of ring 10a and in ring 11a. To avoid spurious undesired stresses rods or cords 12a are located as close as possible to bearings 11b, each such tensioning means being located at points approximately 120° apart around ring 10a. Positive radial positioning between rings 10a and 11a is provided by two tension springs 12d fastened to rings 10a and 11a. Springs 12d are located 120° apart around ring 10a. Positive radial positioning between rings 10a and 11a is provided by two tension springs 12d fastened to rings 10a and 11a. Springs 12d are located 120° apart and close to springs 12c and cause rigid contact between rings 10a and 11a at two points 12e close to springs 12c. By the means described above the radial and other stresses of ring 11a may be held to negligible values while positive positioning of membrane mirror 16a is maintained relative to axis X—X.

If membrane mirror 16a is carefully cast, carefully applied to ring 10a and uniformly coated with metal as previously described, it will be capable of providing curved optical surfaces having desired shapes accurate to the order of $1 \times 10^{-6}$ inch, provided that a highly-uniform electric field of the proper configuration is produced between membrane mirror 16a and a suitable electrode structure. The following explanation will lead to a description of means for achieving an electric field of proper configuration.

It is well known that a membrane or film of uniform surface tension stretched across a circular aperture will assume a truly spherical form, as shown by curve 16b shown in FIGURE 9, if uniformly loaded on one side. A liquid soap bubble film subject to a static air pressure differential is a classic example of this. However, if a uniform, pre-stressed, solid membrane rather than a liquid film is subjected to a pressure differential it will assume a more "flat-bottomed" curve as shown by curve 16c in FIGURE 9. Using pressure for deflection purposes no other curve can be produced using a solid membrane unless the membrane has a non-uniform radial distribution of elasticity and/or thickness. As such non-uniform membranes would be extremely difficult to produce a non-uniform deflecting field should preferably be used with a uniform membrane. An electric field is ideally suited for this purpose since its configuration may be varied by adjustment of geometrical parameters and its magnitude may be varied by changes in the magnitude of the electrical potential used.

Referring to FIGURE 7A, a thin wire or needle electrode 30a may be located along the optical axis X—X of membrane mirror 16a and frictionally snugly fitted in a ball 30b which is frictionally snugly fitted in an insulator 30c fastened to the end face 37g of an electrically-conducting cylindrical housing 37a that is coaxial with axis X—X and attached to support ring 11a. Mirror 16a will then be deflected toward electrode 30a when a voltage supply 50a is conected to electrode 30a by means of a flexible conductor 40a and fixed conductor 40b. Voltage or potential supply 50a is also connected to housing 37a by means of conductor 46a. If ring 10a is not constructed of a conducting material a thin layer of metal may be applied between metal-coated membrane 16a and a flexible conductor 46b which may be used to connect membrane 16a to ring 11a and housing 37a. Parts 37a, 37g and 11a must be electrical conductors. Voltage supply 50a should preferably be closely regulated to the order of a few parts in $10^6$ but should be adjustable, when desired, by means of a control 51.

The point or tip of electrode 30a adjacent to mirror 16a may be moved along axis X—X by means of electrically-insulated handle 30d to move electrode 30a in or out of ball 30b. Due to the rotational freedom of ball 30b in its insulated socket 30c the tip or point of electrode 30a may also be moved in any direction perpendicular to axis X—X by handle 30d. The above-described means will cause the center region of mirror 16a to be attracted more strongly than its peripheral region. This will prevent a "flat-bottomed" curvature of mirror 16a such as curve 16c in FIGURE 9 and will cause mirror 16a to assume a figure-of-revolution about axis X—X that is very close to the spherical, parabolic or other optical shape required in a given type of telescope system.

To obtain a specific desired focal length and shape for mirror 16a the voltage and spacing between the tip of electrode 30a and mirror 16a may each be varied experimentally. The tip of electrode 30a may also be moved laterally if necessary for centering adjustment purposes. These latter adjustments may be made using the means previously described. The optical figure of mirror 16a may be observed while adjustments are being made using a test star and knife-edge, auto-collimation or other optical test means well known to those skilled in the art, such test means being located along optical axis X—X on the concave side of mirror 16a.

In some cases the desired optical figure on mirror 16a may more easily be obtained by modifying the shape of cylindrical housing 37 to another shape such as 37b, 37c, 37d, or 37e as shown in FIGURES 7B, 7C, 7D and 7E, all of which are also figures-of-revolution about optical axis X—X. To avoid small but possibly troublesome peripheral distortions of the electrical field and, hence, the shape of mirror 16a, an electrically-conducting collar plate 37f may be added near the plane of surface 14a.

This plate should preferably be connected electrically to housing 37a or ring 10a. In some cases the desired optical figure on mirror 16a may more easily be obtained if an electrode of finite area 30f is used in lieu of point electrode 30a, as shown in FIGURE 7E. Electrode 30f may be either flat, convex or concave and of various sizes.

The arrangements shown in FIGURES 7A, 7B, 7C, 7D and 7E have the advantage of providing high optical precision on mirror 16a using housing and electrode structures having only normal machine shop accuracy in the range from 0.0005 to 0.050 inch, provided, of course, that the mirror 16a is of high thickness and elastic uniformity, ring 10a is of the high accuracy previously stated, and voltage supply 50a has the regulation previously stated. When desired, optical focus may be adjusted electrically by a vernier adjustment of the voltage supply control 51 or by a small movement of electrode 30a or 30f along axis X—X.

To eliminate interference by external electric fields in the vicinity of conductor 40a, the opening 37h in end plate 37g or in housing 37b, 37c or 37e may be made as small as possible. In addition, an electrically-conducting shield 30e may be electrically connected and fastened to ball 30b or electrode 30a. To eliminate interference by electric fields in the vicinity of the concave side of mirror 16a a highly transparent electrically-conductive shield window 16d may be placed close to mirror 16a and ring 10a. This window may be of thin metal-coated glass or, preferably, a thin membrane similar to mirror membrane 16a attached to the opposite side of ring 10a, as shown in FIGURE 8. Such a membrane type window can be made so thin that it will have negligible optical effect, even though it may not be flat. Window 16d may be electrically connected to membrane mirror 16a by any suitable means well known to those skilled in the electrical art. To eliminate any physical coupling between membrane 16a and membrane 16d when the system is operated or tested in an atmosphere, a small pressure-equalizing hole 10b may be provided in ring 10a as shown in FIGURE 8. This window will not be required when external fields are not present, or when the telescope tube 71 shown in FIGURE 10 is electrically-conductive, sufficiently long with sufficiently small openings, and electrically-connected to mirror 16a.

Since the electric field which produces the optical shape of mirror 16a is totally enclosed or shielded, for all practical purposes, mirror 16a, therefore, cannot be distorted by external electrical fields or space charges. In the configurations shown in FIGURES 1 and 3 (and in the Muller and the Evans Systems) the system is not enclosed and, therefore, is subject to distortions due to external electric fields and/or the fields of the conductors 40 and 46 or their equivalents.

Figure 10:
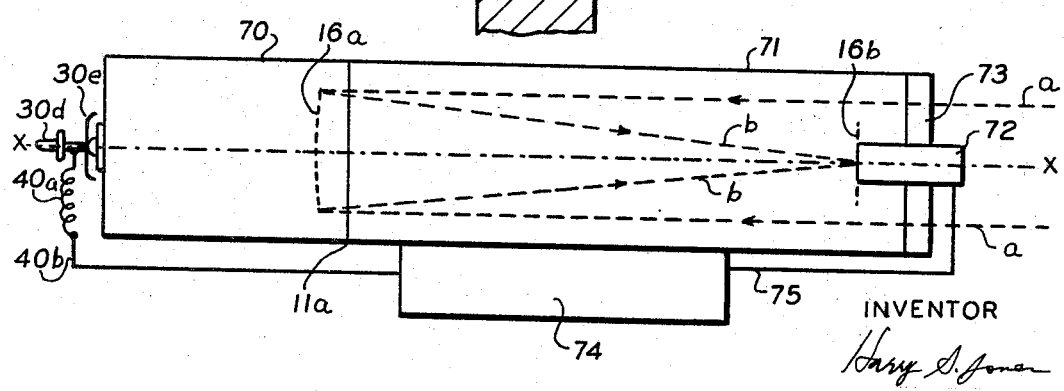
FIGURE 10 is a schematic profile view of a telescope system using a membrane mirror of the type shown in FIGURE 7A.

FIGURE 10 shows a telescope system suitable for use in space having a mirror system 70 of the type shown in FIGURE 7A. A tube or other suitable structure 71 is attached to ring 11a of mirror system 70 which tube carries a photographic or electronic camera, human observer or other image-recording device 72 located at the image plane 16b of mirror 16a in system 70 and is held by a support spider or a transparent window 73. Rays from a distant point are indicated by the character a and the rays focused by mirror 16a are indicated by the character b. All other necessary systems such as power, control, propulsion, fuel and communication may be contained within housing 74 through which conductor 40b and necessary cables 75 are passed.

Although the membrane 16a is preferably located between surface 14a and electrode 30a or 30f as shown in FIGURE 7A, it may, under some conditions, be necessary or desirable to locate ring 14a in the intermediate position in lieu of membrane 16a.

Although electrode 30a or 30f has been shown "hot" or at a different electrical potential relative to housing 37a, 37b, 37c, 37d or 37e, any of which are electrically connected to collar 37f, ring 11a, ring 10a and membrane 16a, all of which may be termed at "ground" potential, it may, under some conditions, be necessary or desirable to operate the membrane mirror "hot" relative to the other parts listed above. This may be accomplished by eliminating insulation 30c or by electrically connecting electrode 30a or 30f to housings 37a, 37b, 37c, 37d or 37e, and by insulating the surfaces of ring 10a in contact with parts 11a, 11b, 12a, 12b and 12d, or by any other suitable means well known to those skilled in electrical art. Conductor 40a may then be connected to a part of ring 10a electrically connected to membrane 16a. Due to the close proximity of "hot" parts 10a and 16a to collar 37f, or for other reasons, it may be desirable to electrically connect collar 37f to membrane 16a rather than to the various housings 37a, 37b, 37c, 37d, or 37e. This may be accomplished by insulation between these housings and collar 37f and by other simple means well known to those skilled in electrical art.

The preferred embodiments of the invention have been illustrated and described. Terms, orientation and proportions are, of course, relative. Changes and modifications can be made and some features can be used in different combinations without departing from the invention as defined in the claims.

What is claimed is:

1. In an electrostatically controllable mirror assembly comprising an electrode, an electrode mounting, a conductive flexible membrane mirror surface, an annular mirror support and a conductive housing extending from said electrode mounting and contacting said mirror support; the improvement which comprises said mirror being mounted on said mirror support on the side thereof facing said electrode, and the internal surface of said housing being a regular geometric surface of revolution having the end thereof proximate said electrode of a smaller diameter than the end thereof proximate said mirror; said mirror having greater reflective accuracy than a substantially similar mirror having a cylindrical housing.

2. The improved mirror claimed in claim 1, wherein said housing has the shape of a truncated cone.

3. The improved mirror claimed in claim 1, wherein said electrode has a surface substantially parallel to the undeflected surface of said mirror.

4. The improved mirror claimed in claim 1, wherein said electrode is needle-shaped.

5. The improved mirror claimed in claim 1, wherein said electrode has as an external surface a convex surface of revolution.

6. The improved mirror claimed in claim 1, wherein said mirror is a metal-coated organic film.

References Cited

UNITED STATES PATENTS

| 2,403,915 | 7/1946 | Evans. | |
| 3,031,928 | 5/1962 | Kopito | 88—76 X |

FOREIGN PATENTS 380,473  8/1932  Great Britain.

JEWELL H. PEDERSEN, *Primary Examiner.*

JOHN K. CORBIN, *Examiner.*